US008646322B2

(12) United States Patent
Henner et al.

(10) Patent No.: US 8,646,322 B2
(45) Date of Patent: Feb. 11, 2014

(54) METHOD AND DEVICE FOR TESTING A FUEL INJECTOR

(75) Inventors: Wolfgang Henner, Munich (DE); Bertram Rensch, Barth (DE); Christian Boie, Holzkirchen (DE); Gunter Freitag, Munich (DE); Jochen Friedmann, Kirchheim (DE); Joerg Staib, Boll (DE); Edgar Holl, Nuertingen (DE); Daniel Strack, Uhingen (DE); Dirk Freundt, Korntal-Muechingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/575,820

(22) PCT Filed: Jan. 3, 2011

(86) PCT No.: PCT/EP2011/050009
§ 371 (c)(1),
(2), (4) Date: Oct. 4, 2012

(87) PCT Pub. No.: WO2011/092042
PCT Pub. Date: Aug. 4, 2011

(65) Prior Publication Data

US 2013/0025354 A1 Jan. 31, 2013

(30) Foreign Application Priority Data

Jan. 29, 2010 (DE) ......................... 10 2010 001 387

(51) Int. Cl.
*G01M 15/00* (2006.01)

(52) U.S. Cl.
USPC ..................................... 73/114.48; 73/114.49

(58) Field of Classification Search
USPC ............................ 73/114.48, 114.49, 114.51
See application file for complete search history.

(56) References Cited

U.S. PATENT DOCUMENTS

| | | | | |
|---|---|---|---|---|
| 6,088,647 | A | 7/2000 | Hemberger et al. | |
| 6,557,530 | B1 * | 5/2003 | Benson et al. | 123/480 |
| 6,823,834 | B2 * | 11/2004 | Benson et al. | 123/299 |
| 7,437,234 | B2 * | 10/2008 | Hälleberg | 701/104 |
| 7,552,709 | B2 * | 6/2009 | Fujii | 123/299 |
| 7,870,846 | B2 * | 1/2011 | Weissenborn et al. | 123/435 |

(Continued)

FOREIGN PATENT DOCUMENTS

| | | |
|---|---|---|
| DE | 19740608 | 3/1999 |
| DE | 19851285 | 3/2000 |

(Continued)

OTHER PUBLICATIONS

International Search Report, PCT International Application No. PCT/EP2011/050009, dated Apr. 13, 2011.

*Primary Examiner* — Freddie Kirkland, III
(74) *Attorney, Agent, or Firm* — Kenyon & Kenyon LLP

(57) ABSTRACT

A method for selecting a procedure for determining the injection time of individual injection operations of a fuel injector, which may be supplied with pressurized fuel via a feed line, includes activating the fuel injector using various known activation durations in the vicinity of a predefined operating point of the fuel injector; detecting the pressure curve over time in the feed line for a number of injection operations; evaluating the detected pressure curves over time using at least two different procedures for determining the injection time from the particular pressure curve; determining the correlation between the determined injection times and the particular activation period; selecting the procedure with the highest correlation.

10 Claims, 13 Drawing Sheets

(56) References Cited

U.S. PATENT DOCUMENTS

| | | | | |
|---|---|---|---|---|
| 7,878,050 | B2 * | 2/2011 | Cueto | 73/114.48 |
| 7,945,372 | B2 * | 5/2011 | Geveci et al. | 701/103 |
| 8,205,491 | B2 * | 6/2012 | Cueto | 73/114.49 |
| 2007/0261483 | A1 * | 11/2007 | Halleberg | 73/117.3 |
| 2011/0077842 | A1 * | 3/2011 | Hofmeister et al. | 701/104 |

FOREIGN PATENT DOCUMENTS

| | | |
|---|---|---|
| DE | 102008033754 | 1/2010 |
| EP | 1854987 | 11/2007 |
| WO | WO 2004065775 | 8/2004 |
| WO | WO 2008092779 | 8/2008 |

* cited by examiner

METHOD AND DEVICE FOR TESTING A FUEL INJECTOR

BACKGROUND INFORMATION

Common rail injection systems working at very high injection pressures are being increasingly used for supplying internal combustion engines with fuel. In these common rail injection systems, fuel is pumped with the aid of a high-pressure pump into a high-pressure common rail, from which the fuel is injected into the combustion chambers of the internal combustion engine using injectors. In particular, for diesel engines, injectors having an injection valve which is opened and closed hydraulically by a servo valve are used to establish the time sequence of the injection operation into the combustion chamber. In this case, the servo valve is actuated by a magnetic or piezoelectric actuator. Legislation on emissions, which is becoming increasingly strict worldwide, and the constant increase in the efficiency of engines result, in the case of these common rail systems, in a larger number of partial injections being required for each injection operation, i.e., for each operating cycle of the internal combustion engine, the quantity of fuel of the individual injection becoming smaller and smaller, and the variance of the injection quantities between multiple injection operations, i.e., operating cycles, having increasingly strict tolerances. This also represents new challenges for the methods and devices for injector testing.

SUMMARY

One object of the present invention is to provide a cost-efficient and robust approach for injector testing having increased accuracy.

In accordance with the present invention, opening and closing the injector generates pressure waves in the injector feed line, and the injection time (i.e., the time during which the injector is open) is determinable by measuring and evaluating the pressure curve in the feed line. There are different procedures to achieve this, based on the evaluation of different features in the pressure curve. Since, due to different influencing factors, the pressure curve changes for each injector type and operating point (temperature, pressure, injection time, etc.) of the injector, so far there is no universally applicable procedure that would deliver the best possible result for any injector type at any operating point. Therefore, the present invention includes a procedure for selecting the most suitable possible procedure from a number of different procedures for the particular specific application.

An example method according to the present invention for selecting a procedure for determining the injection time of the individual injection operations of a fuel injector which is suppliable with pressurized fuel via a feed line includes the steps of activating the fuel injector with different known activation periods in the vicinity of a predefined operating point of the fuel injector; detecting the pressure curve over time in the feed line for a number of injection operations for each activation period; evaluating the detected pressure curves over time using at least two different procedures for determining the injection time for each injection operation; determining the correlation between the determined injection times and the respective activation period; and selecting the procedure having the highest correlation.

The correlation between the injection times and the activation periods may be determined, for example, by calculating Pearson's correlation coefficients. The absolute values of the injection times and activation periods do not have to match.

The procedure thus selected shows the best linear correlation; however, zero point errors and/or slope errors may still occur. In order to accurately determine the correlation between the injection times and the activation periods, a regression function is established from the value pairs of activation periods and ascertained injection times, using the "least squares method," for example. In the case of a straight-line regression, the injection time may be ascertained from the slope as well as the axis segment from the pressure curve. Such a linearization may be performed successfully in particular if only a relatively small region around the particular operating point of the injector is taken into account.

It is also possible to establish a threshold value for the correlation value in such a way that injection times are determined only when the threshold value is exceeded, so that the procedure shows a sufficiently high linear correlation between the injection time and the activation period. Alternatively, the injection times may also be determined when the threshold value is not reached and output with an appropriate warning.

The present invention also relates to a method for determining the injection quantity of individual injection operations of a fuel injector which may be supplied with pressurized fuel via a feed line, including the following steps: selecting the procedure best suited for the particular operating point for determining the injection time using the above-described method; activating the fuel injector at least at one predefined operating point and simultaneously measuring the pressure curve occurring in a feed line; determining the injection time of each individual injection operation from the measured pressure curve, using the selected procedure; and determining the injection quantity of each individual injection operation from the previously determined injection time.

Using the example method according to the present invention, the injection time of an individual injection operation of a fuel injector may be determined reliably with high accuracy even for short injection times.

The example method is applicable to any injector type and in the entire operating range of the particular injector and covers the entire quantity range of different injectors (automobiles, trucks, piezoelectric actuators, solenoid valves). The measuring procedure itself limits the pressure range only because of the pressure sensor, which may have to be adapted or replaced.

By using a pressure sensor which is often already present in the feed line, the acquisition and maintenance costs are reduced. The example method is insensitive to the installation site of the injector and simple to handle, since no complex mechanics or the buildup of a counter pressure is required. The example method allows for simple retrofitting of existing systems having continuous flow measurement and is suitable for use in workshops, since it is robust and contamination resistant.

The present invention also relates to a method for testing a fuel injector, including the following steps: determining the particular injection quantity of a number of individual injection operations of a fuel injector at at least one operating point using the above-described method and statistically evaluating the injection quantities thus determined. Such a testing method allows for a particularly accurate and effective testing of modern high-performance injectors which are operated using high injection pressures of thousands of bar and short injection times.

In one specific embodiment, the method for testing a fuel injector also includes the evaluation of a measure of variance, such as the standard deviation or the variance, of the ascertained injection quantities. This allows the quality of testing to be further improved.

In one specific embodiment, each injection operation includes multiple partial injection operations. The method is so flexible that it is able to also evaluate injection operations including multiple partial injection operations.

In one specific embodiment, the procedure for evaluating the pressure curve over time includes the transformation of the detected pressure curve into the frequency domain. By transforming the pressure curve into the frequency domain, the evaluation of the pressure curve may be improved; in particular, interfering frequency components may be filtered out prior to the further evaluation. In another specific embodiment, the evaluation procedure also includes the back-transformation of the pressure curve from the frequency domain into the space domain or time domain.

In one specific embodiment, the procedure for evaluating the pressure curve over time includes the determination of maximums, minimums, and/or inflection points of the pressure curve. This allows the beginning and the end of the injection operation to be determined in a particularly effective, reliable, and simple manner.

In one specific embodiment, the method includes the activation of the fuel injector using activation periods above and below the operating point. In particular, the method includes the successive activation of the fuel injector using a series of stepwise increasing or decreasing activation periods. Using such a stepwise activation, the correlation between the activation period and the injection time determined from the pressure curve may be determined particularly accurately, and the procedure for evaluating the pressure curve that is most suitable for the particular injector at the examined operating point may be selected particularly effectively.

The present invention also relates to a device for testing a fuel injector. An example of such a device has at least one receptacle for accommodating at least one fuel injector; at least one feed line, which is designed to supply a pressurized fluid to the fuel injector; at least one sensor, which is designed to measure the pressure curve over time; a volume measuring unit, which is designed to detect the flow rate through the injector; at least one actuator, which is designed to activate the fuel injector; and at least one evaluation unit, which is functionally connected to the volume measuring unit, the sensor, and the actuator. The evaluation unit is designed to carry out at least one of the methods according to the present invention.

The sensor for measuring the pressure curve over time in the feed line may be a pressure sensor situated in the feed line or a structure-borne noise sensor mounted on the feed line, which measures the noise generated by the pressure fluctuations propagating in the feed line. Such a structure-borne noise sensor may be designed as a piezoelectric element, for example.

Exemplary embodiments of the present invention are explained below in greater detail with reference to the figures.

DETAILED DESCRIPTION OF EXAMPLE EMBODIMENTS

Figure 1:
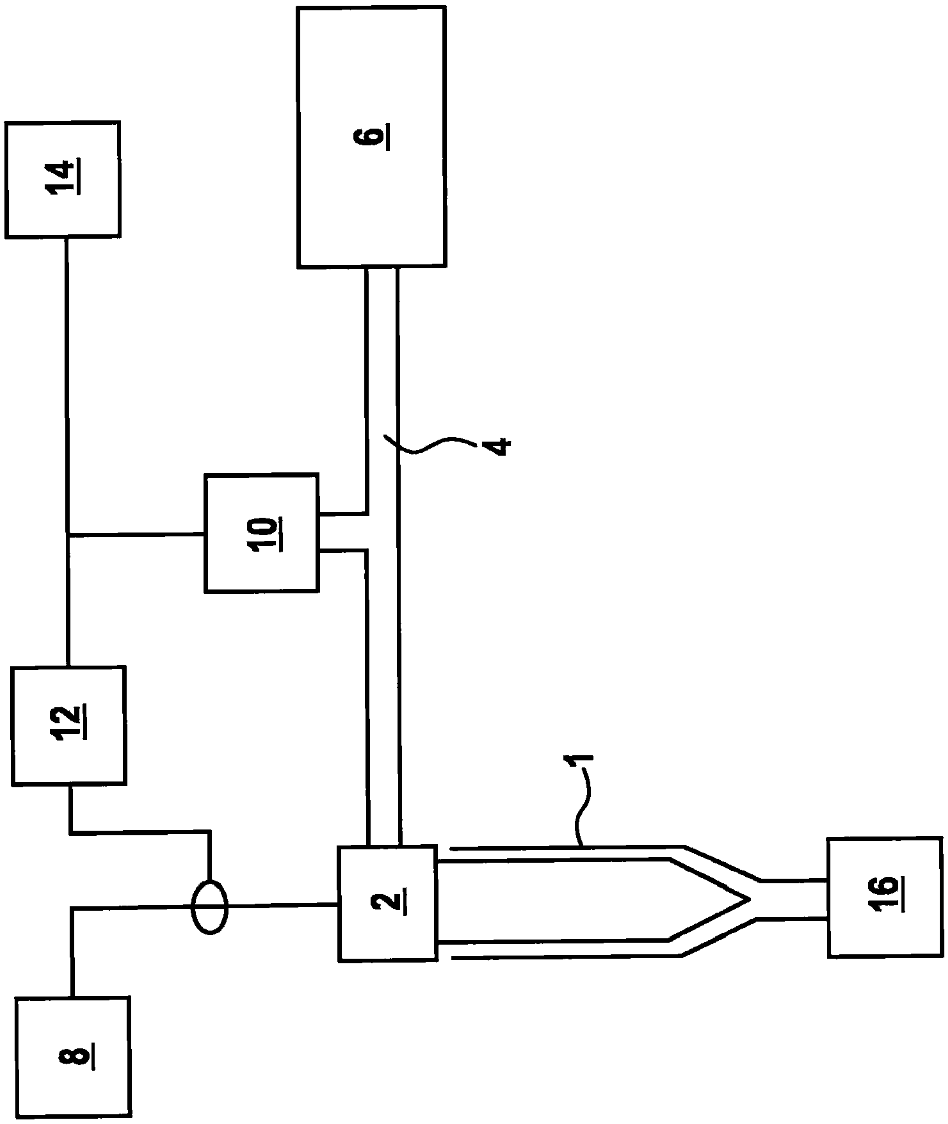
FIG. 1 schematically shows an example device according to the present invention for testing an injector.

FIG. 1 schematically shows an example device according to the present invention for testing an injector 2. Injector 2 to be tested is situated in an injector holder 1 and connected to a (high-) pressure storage device 6 containing a fluid to be injected, e.g., (diesel) fuel or a test oil, via a (high-pressure) feed line 4. Injector 2 is electrically activated by an actuator 8, for example, an engine control unit or a testing device simulating an engine control unit. A pressure sensor 10 is situated in feed line 4 and measures the pressure curve over time in feed line 4. A trigger sensor 12, which may be designed as a current sensor, detects the starting point in time of the electrical activation signal as a trigger. Alternatively, the starting point in time may also be output directly by actuator 8. A measured data detection unit 14 records the measured data, in particular the pressure curve and the trigger signal. A volume measuring unit 16 makes it possible to detect the continuous flow or the sum of the injection quantities of multiple injections. Volume measuring unit 16 may be located, as FIG. 1 shows, on the low-pressure side, i.e., the discharge side of injector 2 or in feed line 4 on the high-pressure side. It may also be connected directly to measured data detection unit 14.

Figure 2:
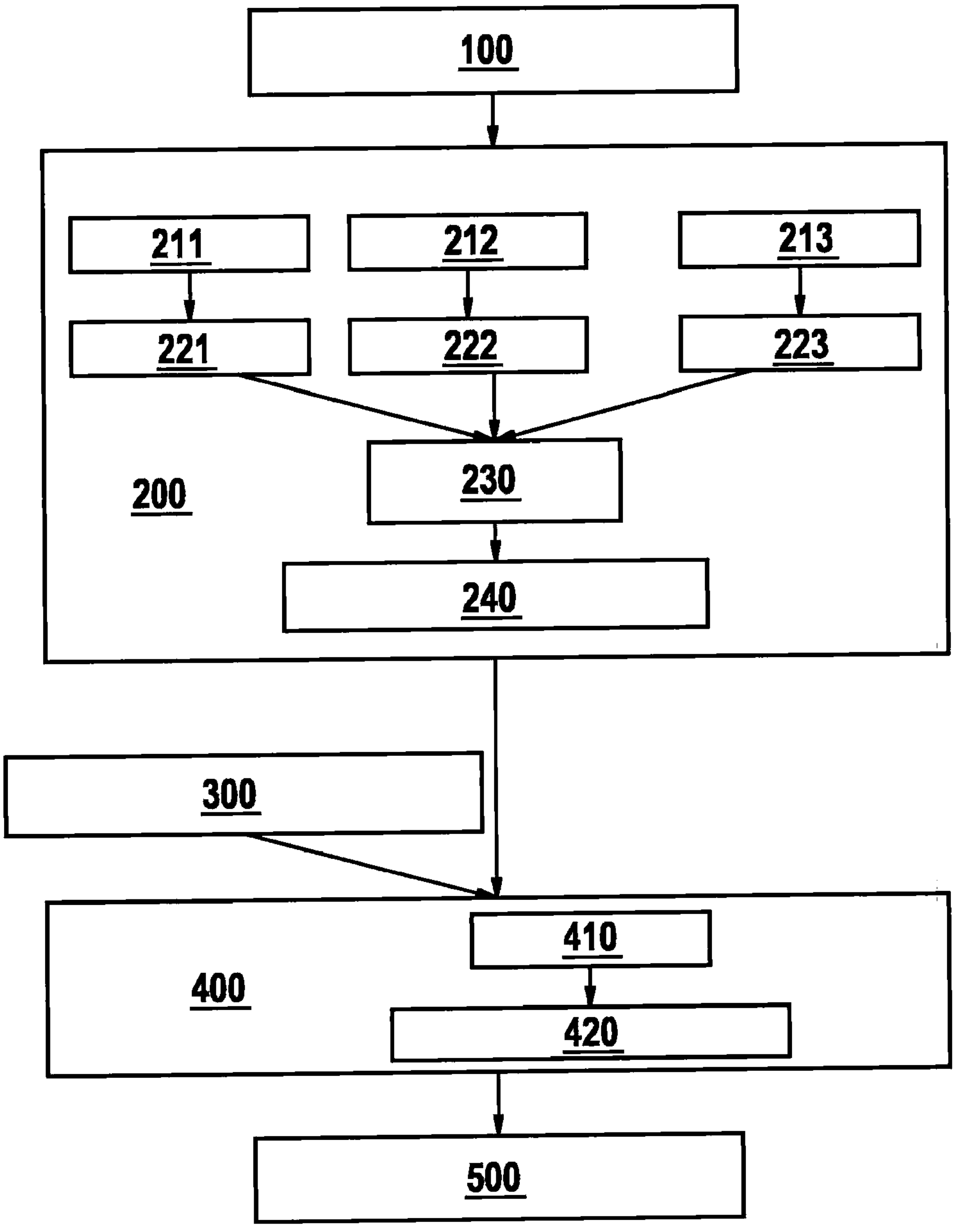
FIG. 2 shows a schematic flow chart of an example testing method according to the present invention.

FIG. 2 shows as an example, in a schematic flow chart, the sequence of an example method according to the present invention.

In a first step 100, a number of injection operations having different activation periods take place in the vicinity of an operating point to be measured (test point), and the pressure curves present in feed line 4 are measured and, if necessary, stored. In the subsequent evaluation (step 200), the pressure curves are evaluated. In doing so, either the previously stored pressure curves may be used or the measured pressure curves may be evaluated immediately without temporary storage. In particular, the injection times are determined from the respective pressure curves using different procedures (steps 211, 212, 213), and the correlation between the injection times thus ascertained and the corresponding activation periods is calculated (steps 221, 222, 223). The correlation values thus determined are compared to each other, and the procedure with the best correlation, i.e., with the highest correlation value, is selected for evaluating the subsequent measurement (step 230).

A relationship between the injection time and the injection quantity is established for the procedure thus selected (step 240). For this purpose, the sum of injection quantities for a number of injection operations, measured using volume measuring unit 16, may be used for ascertaining the relationship between injection time and injection quantity. For a proportionality between injection quantities and injection time to be calculated, the mean activation periods of the corresponding injection quantities must be different.

If the injection quantities are determined from a continuous flow lasting for 2 to 3 minutes, for example, a mean injection quantity is obtained. This eliminates errors due to measured value variances.

Alternatively, the injection time may also be examined. The relationship between injection quantity and injection time is determined at two points in the vicinity of the operating point, and a regression function is established through these two points. Interpolation is performed between these points for calculating the injection quantity from the injection time. Linearization is possible in particular if only a small region around the particular operating point is examined.

In step 300, the measured data, i.e., the pressure fluctuations over time in the feed line when the injector is activated at the operating point, are measured and, if necessary, stored. This may take place before or after the best suitable procedure has been selected (injection quantity correlation) in steps 100 and 200. This may take place before or after step 100, as well as before, after, or during the selection of the best suited procedure (injection quantity correlation) in step 200.

The data measured at the operating point are evaluated (step 400); in particular, the injection times of the individual injection operations are determined (step 410) from the recorded pressure curves using the procedure ascertained during the injection quantity correlation, and the individual injection quantities are ascertained from the injection times (step 420). In doing so, either the previously stored pressure curves may be used, or the measured pressure curves may be evaluated directly without temporary storage.

The individual injection quantities are statistically evaluated (step 500) to determine the quality of injector 2.

Figure 3A:
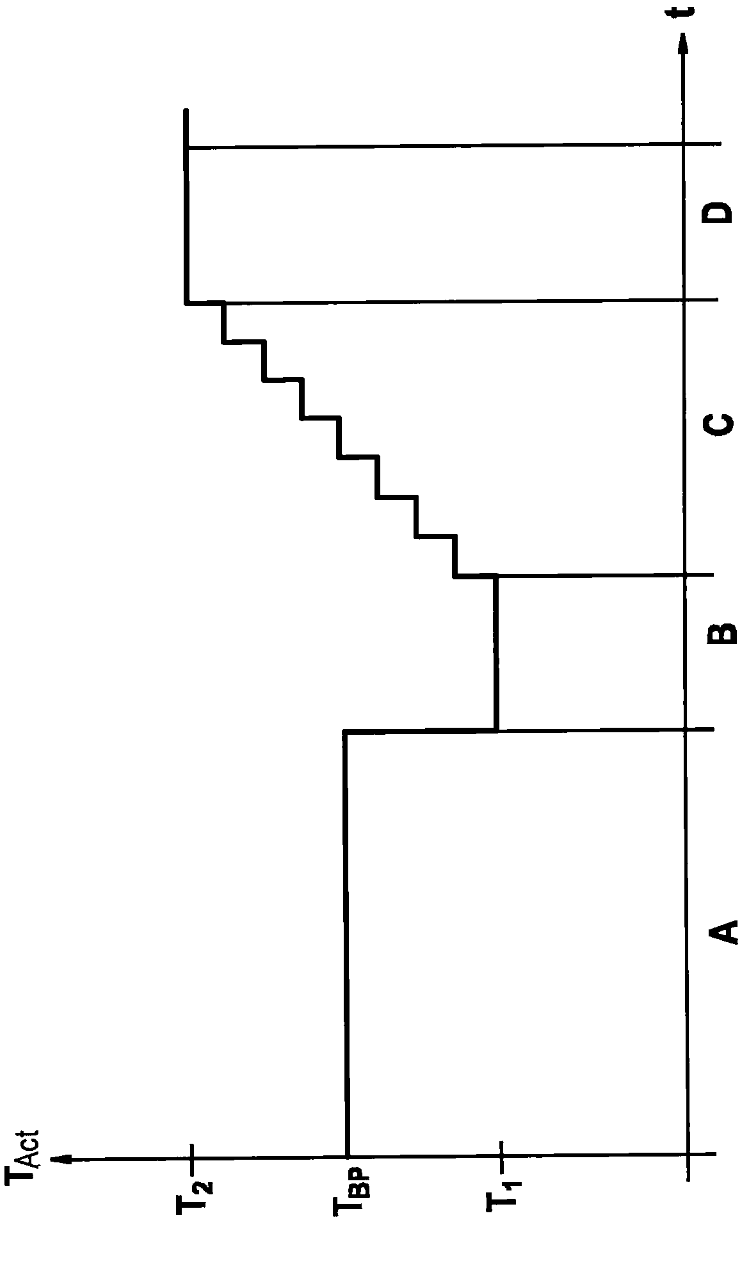
FIG. 3*a* shows, as an example, the activation of an injector during the injection quantity correlation.

FIG. 3*a* shows, as an example, the activation of an injector 2 during the injection quantity correlation. In the diagram shown in FIG. 3*a*, activation period $T_{act}$ (y axis) is plotted for different activation phases against time t.

Injector 2 is initially activated at the operating point with activation period $T_{act}$ (phase A). Subsequently, activation period $T_{act}$ is reduced to a period $T_1$ below operating point $T_{op}$ and, after a stabilization phase, the pressure curve in feed line 4 is measured and recorded (phase B). At the same time, a flow quantity $V_1$ is measured for a number of injection operations having activation period $T_1$.

Later, activation period $T_{act}$ is increased stepwise to an upper activation period $T_2$ above operating point $T_{op}$ of the injector (phase C).

For the upper activation period $T_2$, which is above operating point $T_{op}$, flow quantity $V_2$ is measured again, after a stabilization period, for a number of injections having activation period $T_2$ (phase D).

For each activation period $T_{act}$ the pressure curve over time in feed line 4 is measured and recorded for a number of injection operations which is statistically sufficient for achieving the required accuracy.

The relationship between the injection time and the injection quantity is ascertained with the aid of a straight line regression (linear approximation) from flow quantities $V_1$, $V_2$ measured for activation periods $T_1$ and $T_2$.

Figure 3B:
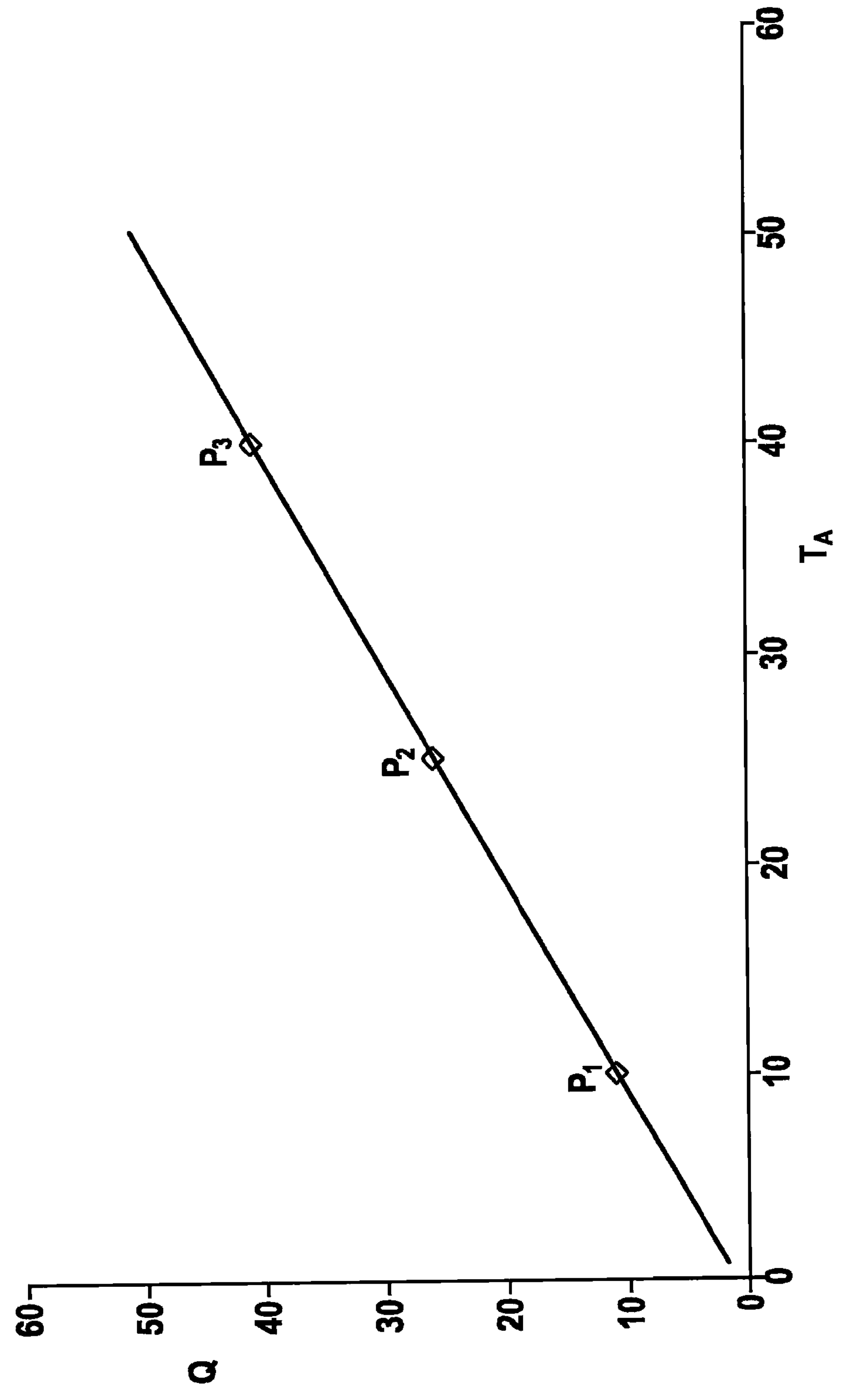
FIG. 3*b* shows the injection quantity as a function of the activation period.

FIG. 3*b* shows the measured flow quantity Q (y axis) as a function of activation period $T_A$ (x axis) for three different activation periods, in particular at the operating point (P2), below and above the operating point (P1, P3).

FIG. 3*b* shows that the flow quantity as a function of the injection time in the examined region may be satisfactorily approximated using a straight line.

Figure 4A:
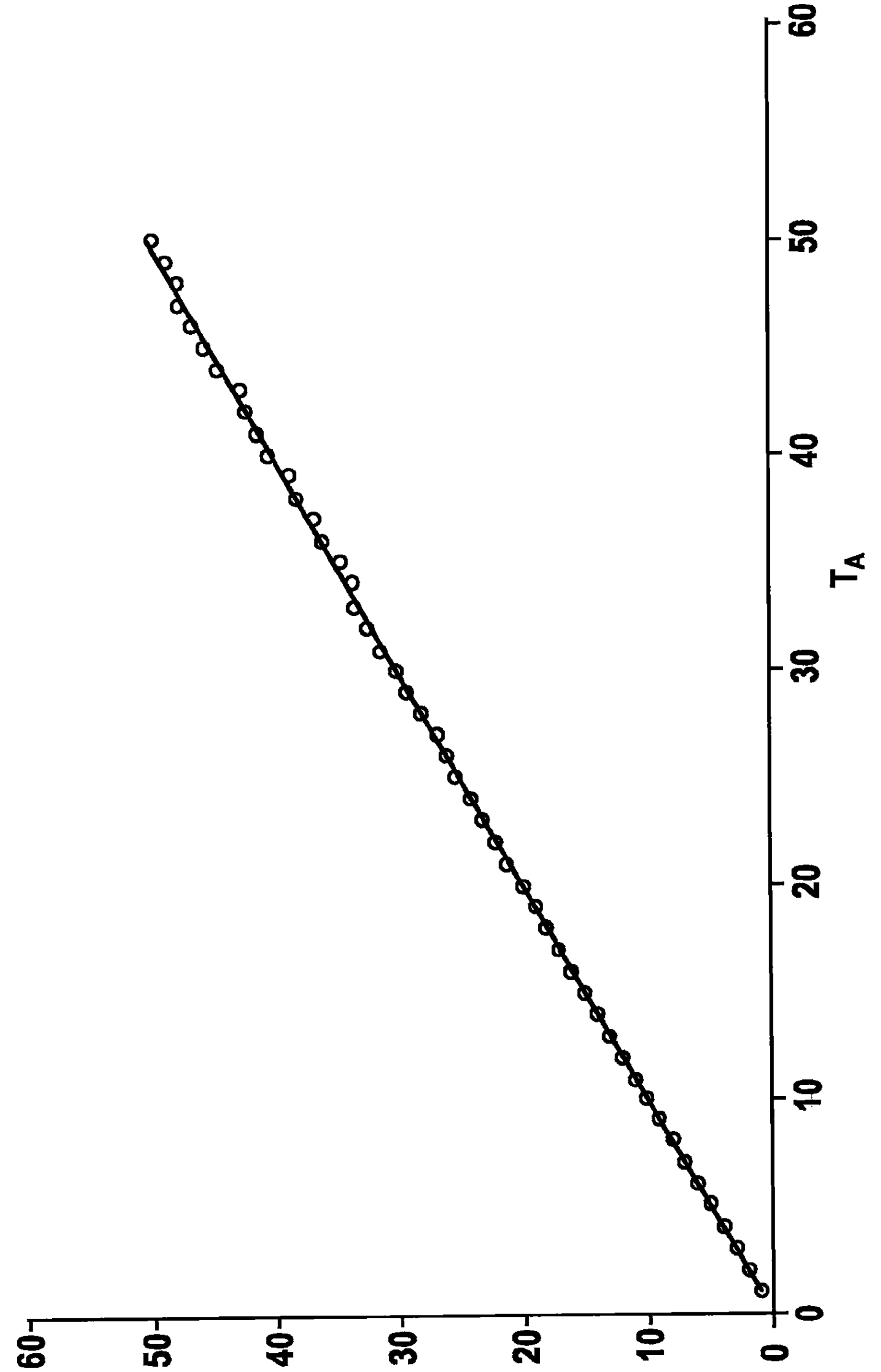
FIGS. 4*a* and 4*b* show the corresponding injection times ascertained for the various activation periods, two different procedures having been used for ascertaining the injection times.
Figure 4B:
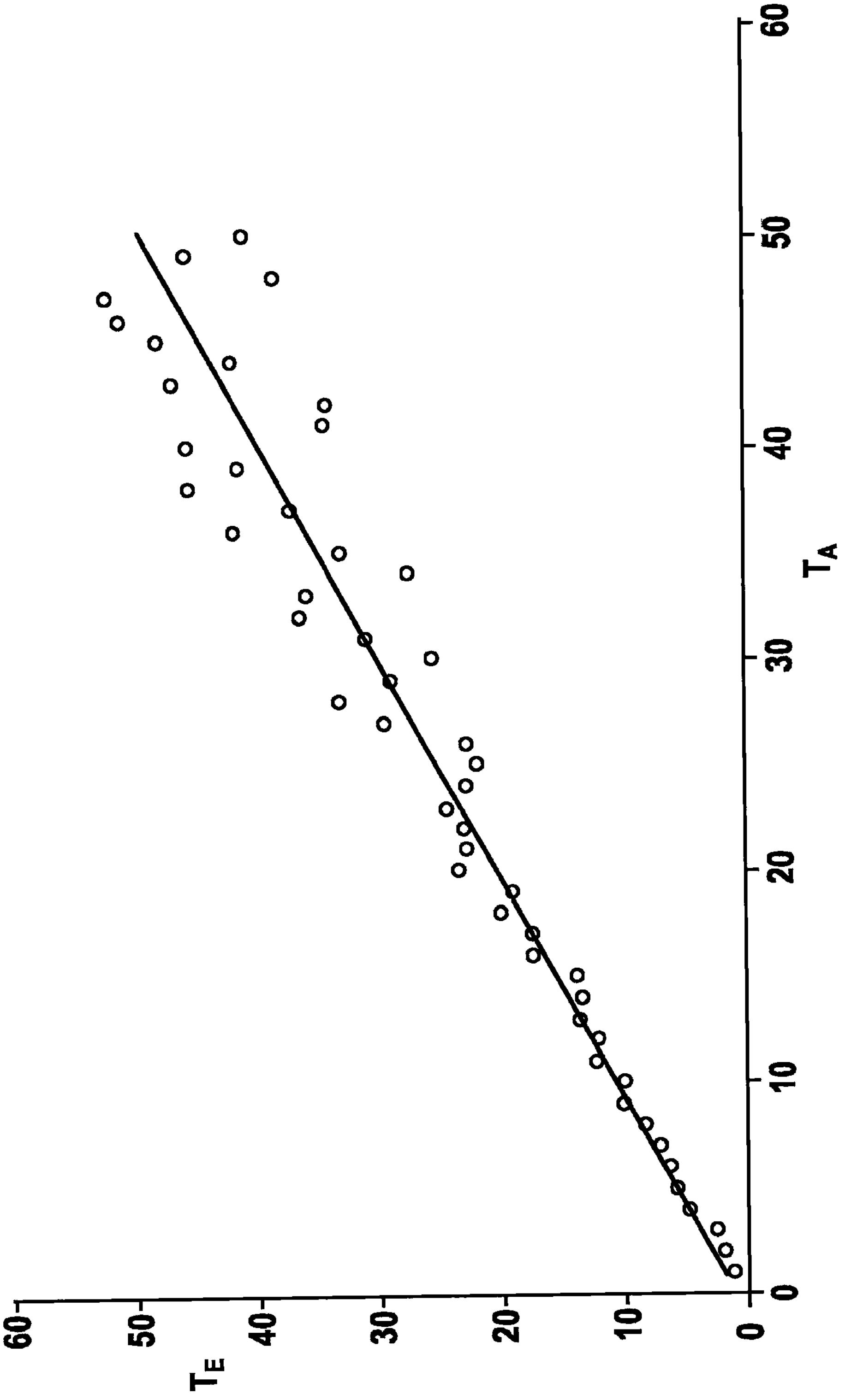

FIGS. 4*a* and 4*b* show, for different activation periods $T_A$ (x axis), the corresponding injection times $T_I$ (y axis) ascertained from the pressure curves in the feed line, a different procedure having been used for ascertaining injection time $T_I$ for each of the two figures.

FIGS. 4*a* and 4*b* clearly show that injection times $T_1$ ascertained using the first procedure (FIG. 4*a*) show a much better correlation to activation times $T_A$ than injection times $T_I$ ascertained using the second procedure (FIG. 4*b*). Therefore, in this case, the first procedure (FIG. 4*a*) is to be preferred for evaluating the measured data at the operating point.

Figure 5A:
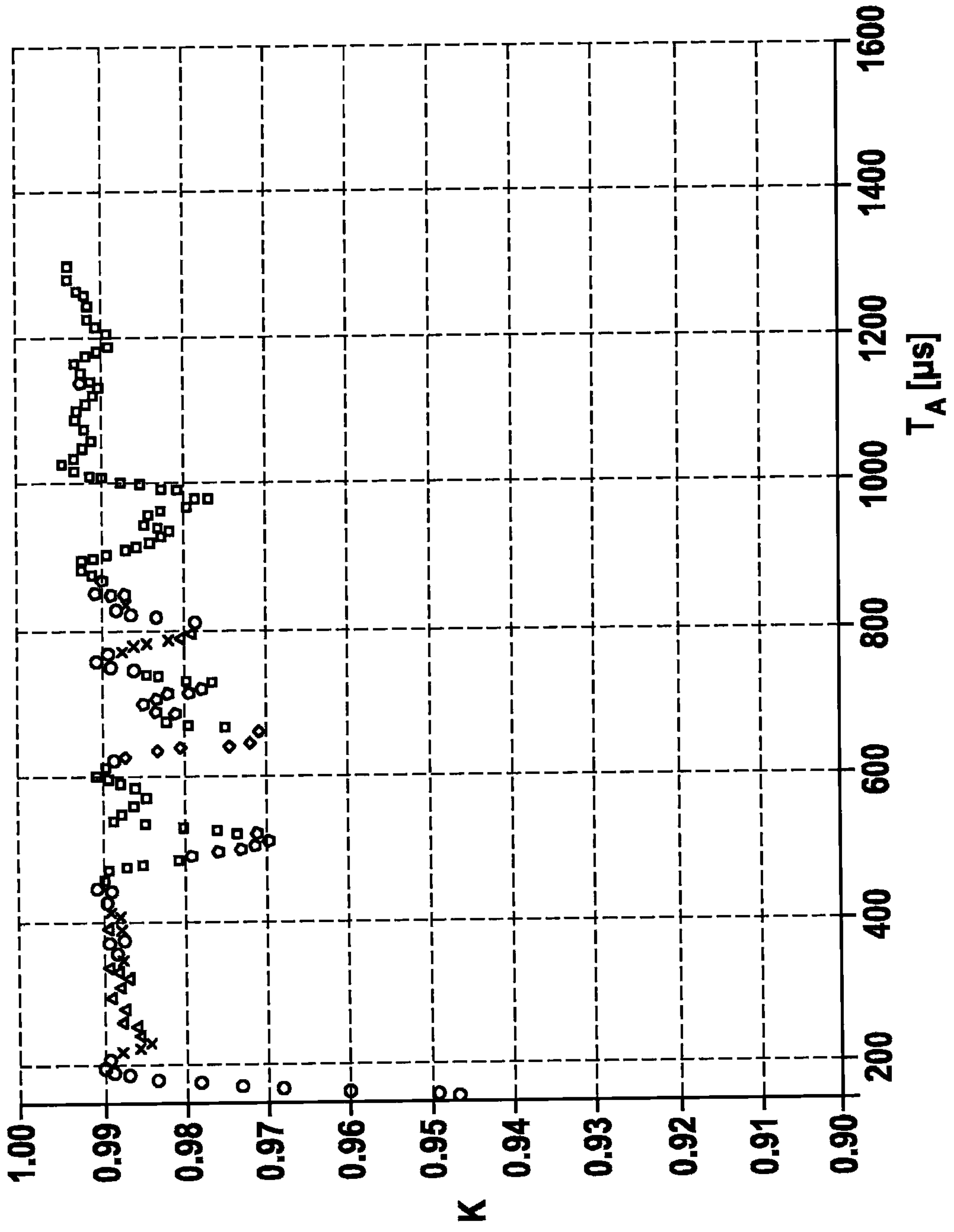
FIGS. 5*a* and 5*b* show the ideal correlation values ascertained for different operating points as a function of the activation period.
Figure 5B:
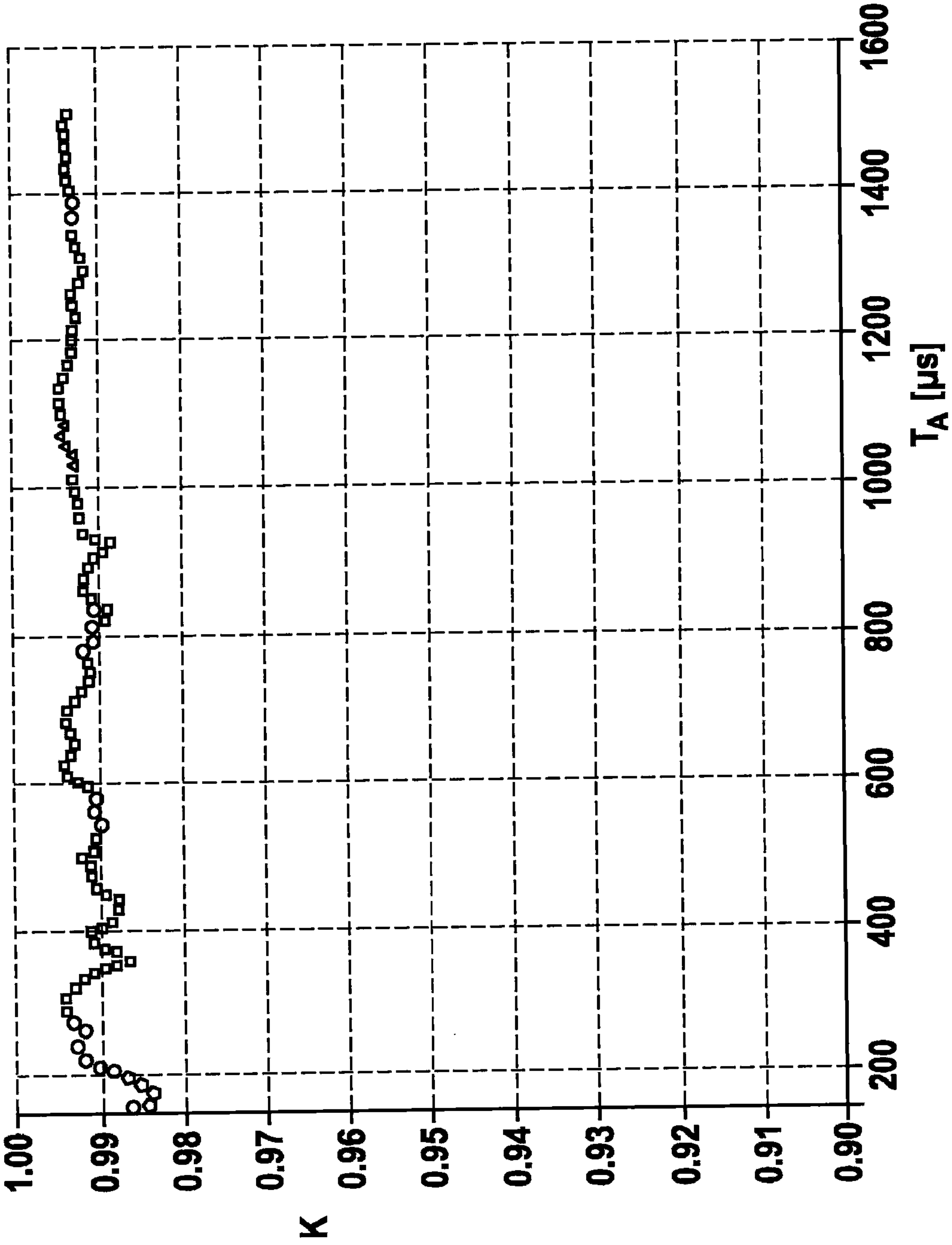

FIGS. 5*a* and 5*b* show the ideal correlation values K (y axis) ascertained for different operating points as a function of the activation period $T_A$ (x axis).

The data of FIG. 5*a* were recorded at an injection pressure of 1000 bar, such as occurs, for example, in partial load operation of the engine, and the data of FIG. 5*b* were recorded at an injection pressure of 400 bar, such as occurs, for example, in idle mode.

FIGS. 5*a* and 5*b* only show correlation values K determined using the ideal procedure for the particular operating point. The different procedures are distinguished by using different symbols for the test points.

The data shown in FIGS. 5*a* and 5*b* show that the ideal procedure, i.e., the procedure resulting in the best correlation between activation period and injection time, is a function of both the injection pressure and the activation period. Therefore, the ideal procedure is to be determined anew for each injector and for each operating point.

The results further show that in this example, the correlation at a lower injection pressure (for example, in idle mode) is better overall and, in the case of changing activation period $T_A$, is subject to smaller fluctuations (FIG. 5*b*) than at a higher injection pressure such as occurs, for example, in the partial load range (FIG. 5*a*).

Figure 6A:
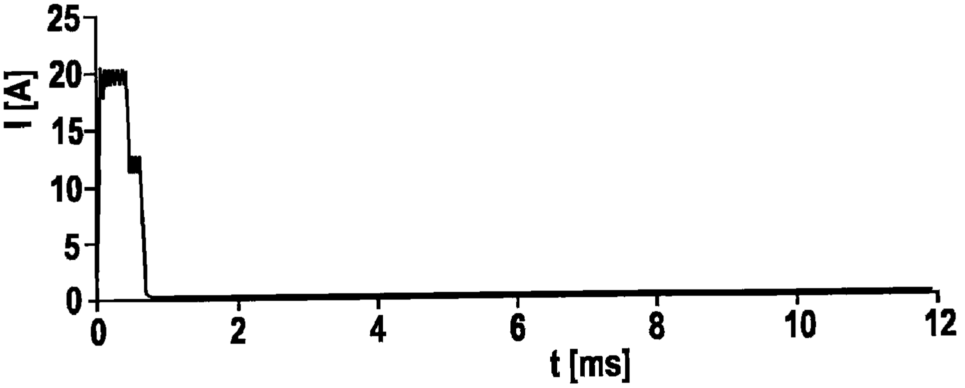
FIGS. 6*a* and 6*b* show, as an example, the activation of an injector at the operating point and the resulting pressure curve in the feed line.
Figure 6B:
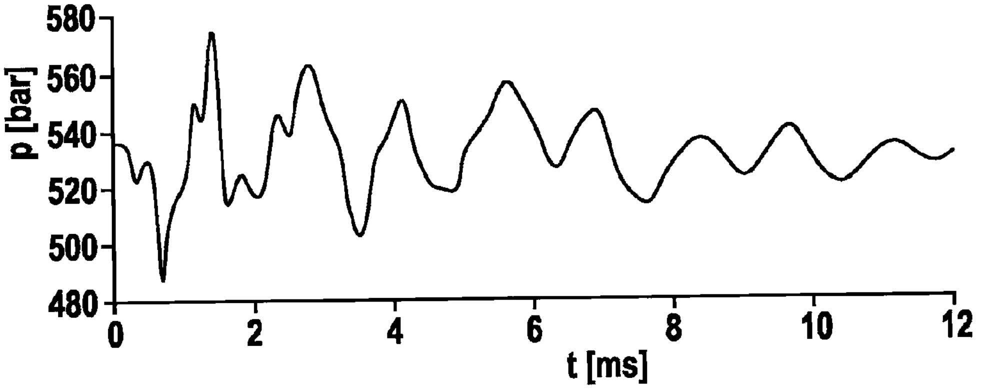

FIGS. 6*a* and 6*b* show, as an example, the activation of an injector at the operating point (FIG. 6*a*) and the resulting pressure curve p in feed line 4 (FIG. 6*b*).

From features of this pressure curve, such as maximums, minimums, and/or inflection points, injection time $T_I$ associated with a predefined activation period $T_A$ may be calculated. This may be done using different procedures which weight the individual features differently. The procedure best suited for the particular operating point is selected using the above-described method.

A procedure may also include transformation of the measured pressure curve into the frequency domain and its further processing there.

Figure 7A:
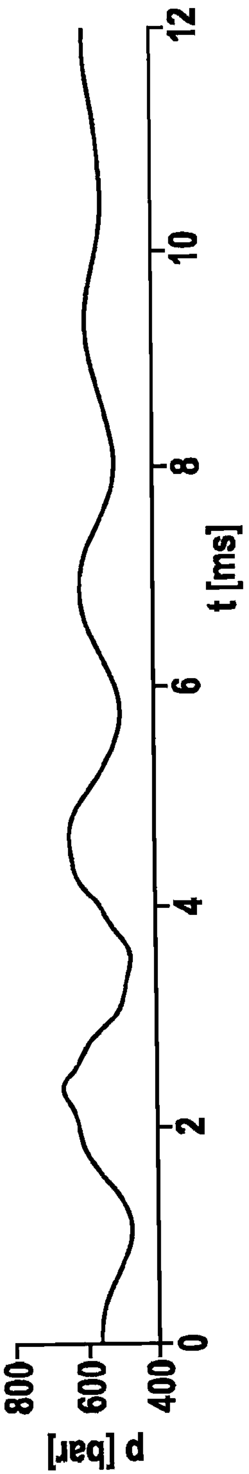
FIGS. 7*a* through 7*d* show the measured pressure curve in the time domain (FIGS. 7*a* and 7*d*) and in the frequency domain (FIGS. 7*b* and 7*c*).
Figure 7B:
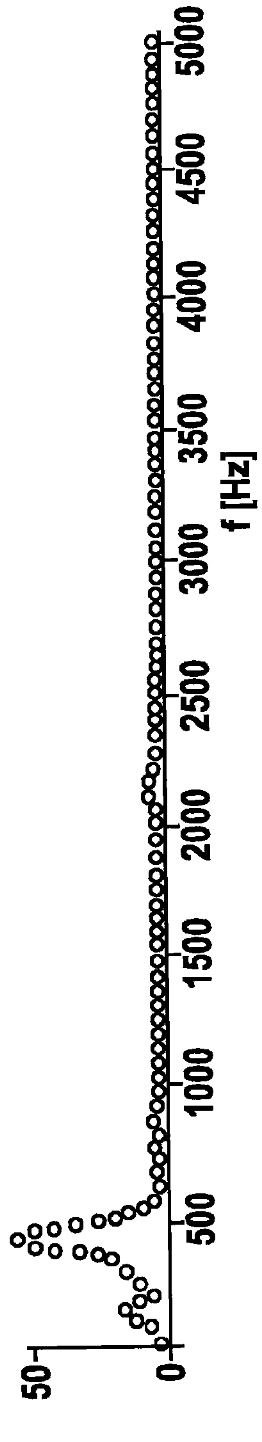

FIG. 7*a* shows, as an example, such a pressure curve in the space and time domains, and FIG. 7*b* shows the signal transformed into the frequency domain with the aid of a fast Fourier transformation (FFT), for example. The signal has strong frequency components in the range around 500 Hz, which make evaluation of the much weaker frequency components in the range of higher frequencies more difficult.

Figure 7C:
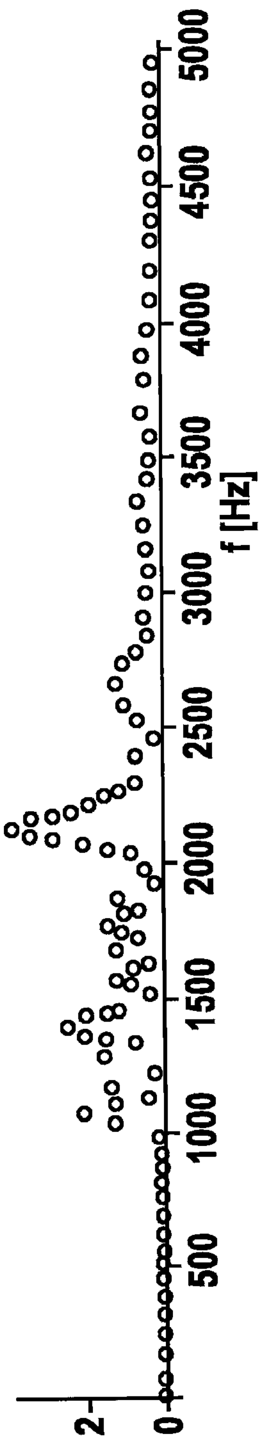

In the frequency spectrum shown in FIG. 7*c*, low-frequency components (<1000 Hz) are filtered out, so that the higher-frequency components (>1000 Hz) are much better recognizable and evaluatable.

Figure 7D:
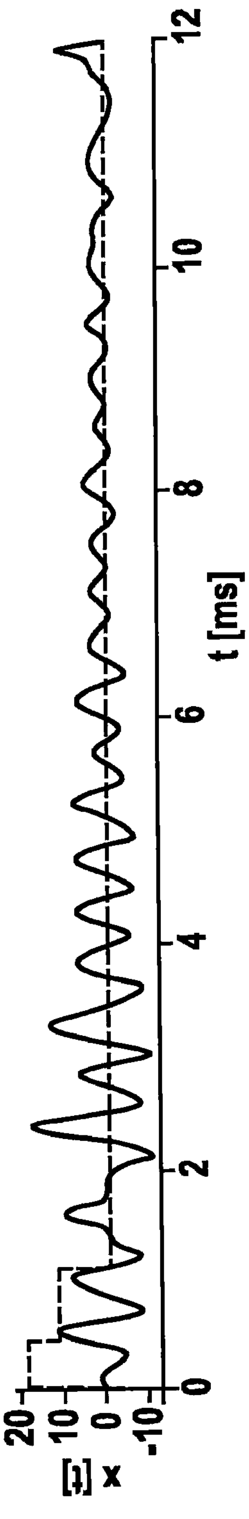

FIG. 7*d* shows the processed signal back-transformed into the time domain. For comparison, the electrical activation signal is also shown as a dashed line.

Figure 8:
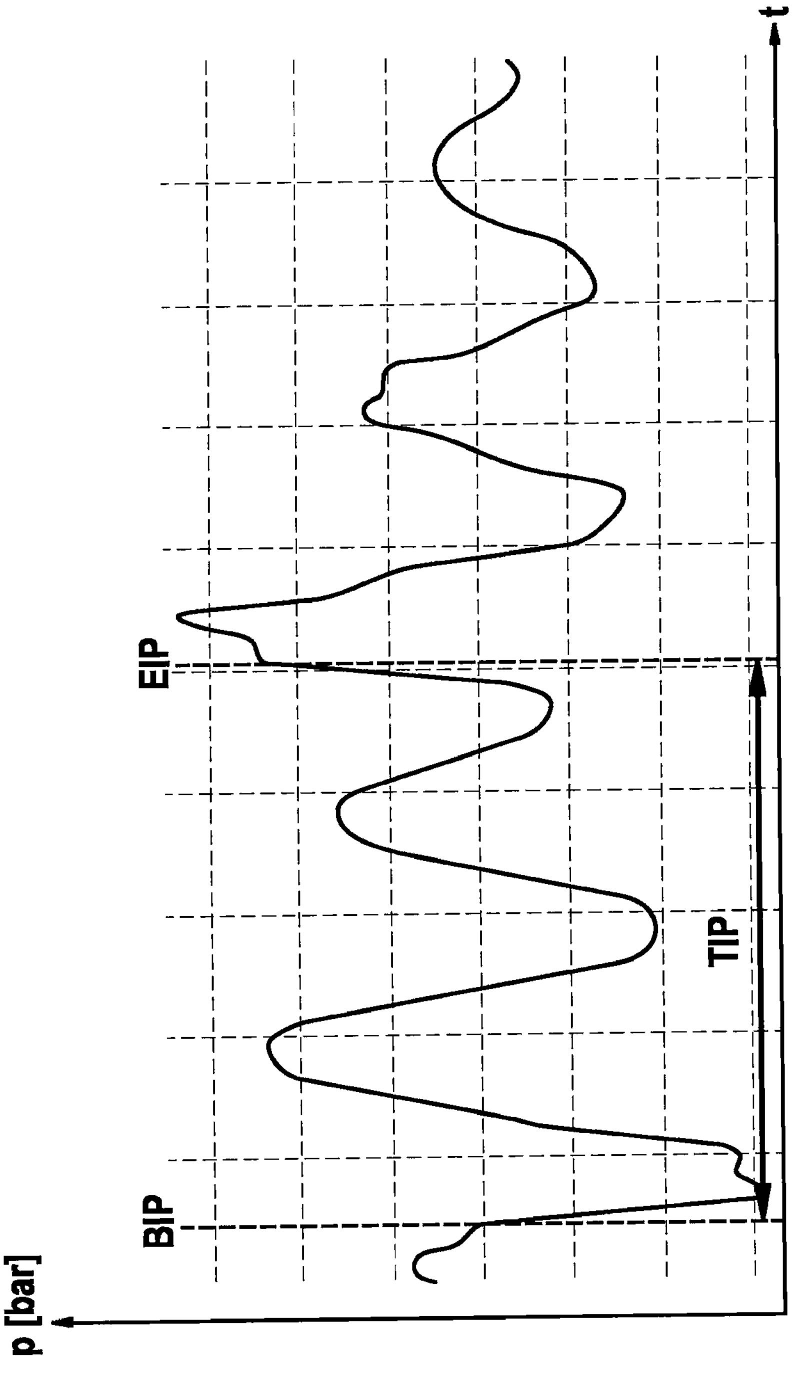
FIG. 8 shows an enlarged section of a modified pressure curve in the time domain.
Figure 9:
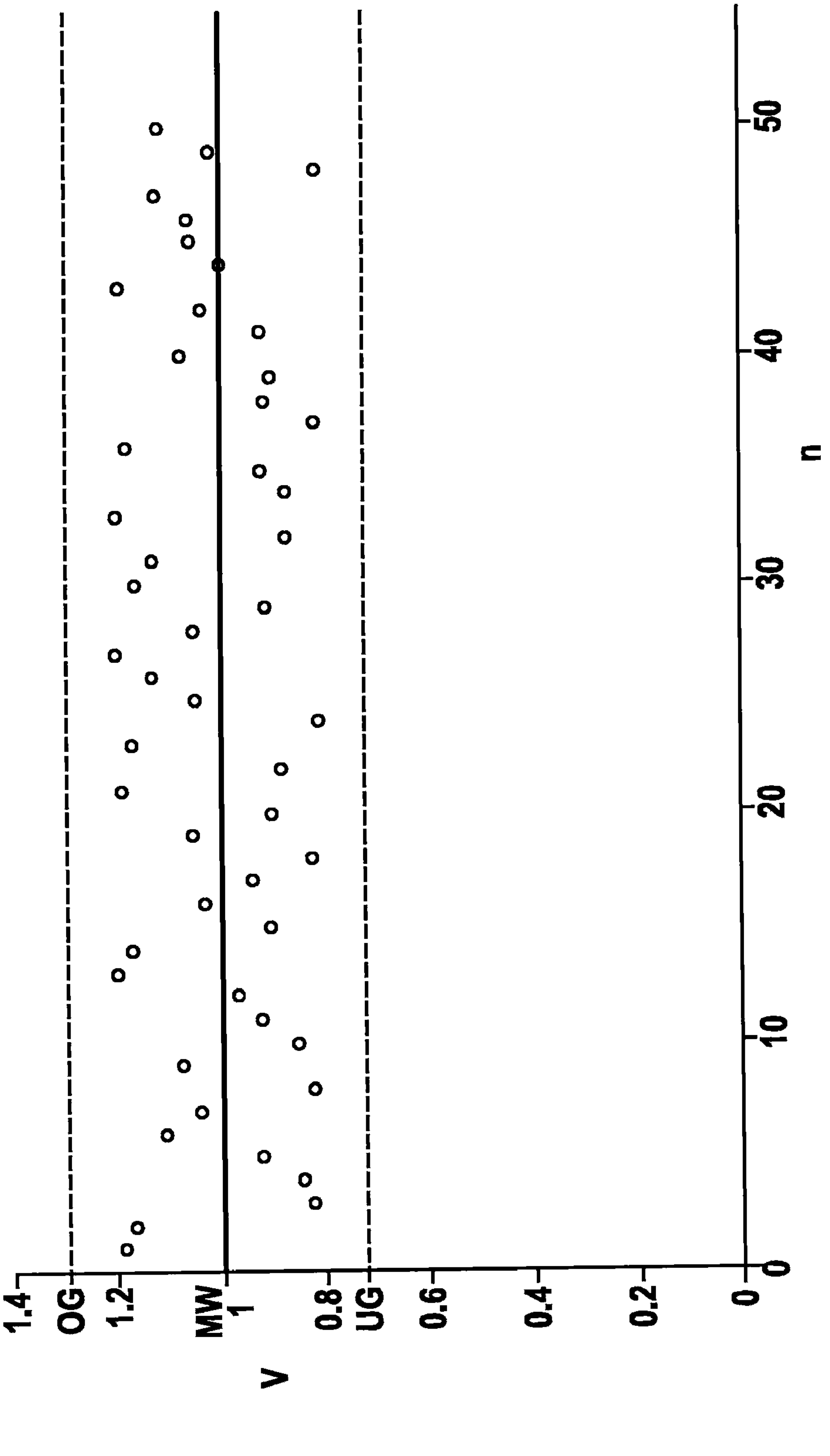
FIG. 9 shows a number of injections and the corresponding injection quantities.

FIG. 8 shows an enlarged section of the processed signal in the time domain, i.e., pressure p (y axis) in feed line 4 as a function of time t (x axis). The beginning (BIP) and end (EIP) of the injection operation are determined using predefined features, here characteristic inflection points. Injection time TIP is yielded as the difference of the time between the end (EIP) and the beginning (BIP) of the injection operation.

What is claimed is:

1. A method for selecting a procedure for determining an injection time of individual injection operations of a fuel injector which may be supplied with pressurized fuel via a feed line, comprising:

activating the fuel injector with different, known activation periods in a vicinity of a predefined operating point of the fuel injector;

detecting a pressure curve over time in the feed line for a number of injection operations;

evaluating the detected pressure curves over time using at least two different procedures for determining a particular injection time;

determining a correlation between the determined injection times and particular activation periods; and selecting a procedure having the highest correlation from the at least two different procedures.

2. The method as recited in claim 1, wherein at least one procedure for evaluating the pressure curve over time includes transforming the detected pressure curve into frequency domain.

3. The method as recited in claim 1, wherein at least one procedure for evaluating the pressure curve over time includes determining at least one of maximums, minimums, and inflection points, of the pressure curve.

4. A method for determining an injection quantity of individual injection operations of a fuel injector which may be supplied with pressurized fuel via a feed line, comprising:

selecting a best suited procedure for a particular operating point for determining an injection time by activating the fuel injector with different, known activation periods in a vicinity of a predefined operating point of the fuel injector, detecting a pressure curve over time in the feed line for a number of injection operations, evaluating the detected pressure curves over time using at least two different procedures for determining a particular injection time, determining a correlation between the determined injection times and particular activation periods, and selecting a procedure having the highest correlation from the at least two different procedures;

activating the fuel injector at at least one predefined operating point and measuring pressure curve present in a feed line;

determining an injection time of each individual injection operation from the measured pressure curve using the selected procedure; and determining the injection quantity of each individual injection operation from the injection time.

5. The method as recited in claim 4, wherein the activating fuel injector includes activation of the fuel injector with activation periods above and below the operating point.

6. The method as recited in claim 4, wherein the activating fuel injector includes activation of the fuel injector using stepwise increasing or decreasing activation periods.

7. The method as recited in claim 4, wherein each of the injection operations includes multiple partial injection operations.

8. A method for testing a fuel injector, comprising:

determining the particular injection quantity of a number of individual injection operations of the fuel injector at at least one operating point by selecting a best suited procedure for a particular operating point for determining an injection time by activating the fuel injector with different, known activation periods in a vicinity of a predefined operating point of the fuel injector, detecting a pressure curve over time in the feed line for a number of injection operations, evaluating the detected pressure curves over time using at least two different procedures for determining a particular injection time, determining a correlation between the determined injection times and particular activation periods, and selecting a procedure having the highest correlation from the at least two different procedures, activating the fuel injector at at least one predefined operating point and measuring pressure curve present in a feed line, determining an injection time of each individual injection operation from the measured pressure curve using the selected procedure, and determining the injection quantity of each individual injection operation from the injection time; and statistically evaluating the injection quantities thus determined.

9. The method for testing a fuel injector as recited in claim 8, wherein the statistically evaluating step includes evaluation of a measure of variance of ascertained injection quantities.

10. A device for testing a fuel injector, comprising:

at least one receptacle for accommodating at least one fuel injector;

at least one feed line to supply the fuel injector with pressurized fluid during operation;

at least one sensor to measure a pressure curve over time in the feed line;

at least one volume measuring unit to detect flow through the injector;

at least one actuator to activate the fuel injector; and at least one evaluation unit functionally connected to the volume measuring unit, the sensor, and the actuator and configured to activate the fuel injector with different, known activation periods in a vicinity of a predefined operating point of the fuel injector, to detect a pressure curve over time in the feed line for a number of injection operations, to evaluate the detected pressure curves over time using at least two different procedures for determining a particular injection time, to determine a correlation between the determined injection times and particular activation periods, and to select a procedure having the highest correlation from the at least two different procedures.

* * * * *

UNITED STATES PATENT AND TRADEMARK OFFICE

CERTIFICATE OF CORRECTION

PATENT NO. : 8,646,322 B2
APPLICATION NO. : 13/575820
DATED : February 11, 2014
INVENTOR(S) : Henner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2 days.

Signed and Sealed this
Twenty-ninth Day of September, 2015

Michelle K. Lee
*Director of the United States Patent and Trademark Office*